(12) United States Patent
Lee

(10) Patent No.: US 9,445,469 B2
(45) Date of Patent: Sep. 13, 2016

(54) BACKLIGHT DRIVING APPARATUS AND LIQUID CRYSTAL DISPLAY DEVICE USING THE SAME

(71) Applicant: LG Display Co., Ltd., Seoul (KR)

(72) Inventor: Joung Woo Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 242 days.

(21) Appl. No.: 14/082,611

(22) Filed: Nov. 18, 2013

(65) Prior Publication Data

US 2014/0176618 A1 Jun. 26, 2014

(30) Foreign Application Priority Data

Dec. 26, 2012 (KR) .................. 10-2012-0153461

(51) Int. Cl.
*H05B 33/08* (2006.01)
*G09G 3/34* (2006.01)

(52) U.S. Cl.
CPC ........ *H05B 33/0818* (2013.01); *G09G 3/3426* (2013.01); *H05B 33/086* (2013.01); *Y02B 20/346* (2013.01)

(58) Field of Classification Search
CPC .................. G09G 3/3406; G09G 2330/0426
See application file for complete search history.

(56) References Cited

U.S. PATENT DOCUMENTS

| 7,145,295 | B1 | 12/2006 | Lee et al. | |
|---|---|---|---|---|
| 8,258,714 | B2* | 9/2012 | Liu | H05B 33/0818 315/210 |
| 2009/0322234 | A1* | 12/2009 | Chen | H05B 33/0815 315/159 |
| 2012/0306388 | A1 | 12/2012 | Jang | |
| 2013/0229829 | A1* | 9/2013 | Zhang | H02M 3/33507 363/16 |

FOREIGN PATENT DOCUMENTS

CN 101588664 A 11/2009

* cited by examiner

*Primary Examiner* — Amare Mengistu
*Assistant Examiner* — Shawna Stepp Jones
(74) *Attorney, Agent, or Firm* — Fenwick & West LLP

(57) ABSTRACT

Disclosed is a backlight driving apparatus. The backlight driving apparatus includes a light source configured to include at least one LED, a DC-DC converter configured to generate a driving voltage according to a turn-on of a switching element and supply the driving voltage to the light source, a feedback circuit configured to generate a feedback voltage corresponding to a voltage level of the driving voltage supplied from light source, a duty controller connected to the light source, and configured to control a turn-on period of the LED according to an LED duty signal corresponding to a backlight dimming signal, and a switching controller configured to generate a PWM signal for controlling the turn-on of the switching element according to the feedback signal, generate a switching control signal corresponding to the PWM signal according to the LED duty signal, and selectively control the turn-on of the switching element.

13 Claims, 5 Drawing Sheets

BACKLIGHT DRIVING APPARATUS AND LIQUID CRYSTAL DISPLAY DEVICE USING THE SAME

CROSS-REFERENCE TO RELATED APPLICATIONS

This application claims the benefit of the Korean Patent Application No. 10-2012-0153461 filed on Dec. 26, 2012, which is hereby incorporated by reference as if fully set forth herein.

BACKGROUND

1. Field of the Invention

The present invention relates to a backlight driving apparatus and a liquid crystal display (LCD) device using the same, and more particularly, to a backlight driving apparatus and an LCD device using the same, which can minimize a loss of power to enhance power conversion efficiency.

2. Discussion of the Related Art

Backlights are devices that irradiate light on a display panel, and use a cold cathode fluorescent lamp (CCFL) as a light source. However, when the CCFL is used, a harmful environment is caused by mercury, a response time to an applied signal is slowed by about 15 ms, and a color reproducibility is lower by about 75% with respect to standards published by the National Television Standard Committee (NTSC). Also, the CCFL causes other problems such as predetermined white light being emitted. For this reason, recently, light emitting diodes (LEDs) are drawing much attraction as a light source.

In comparison with CCFLs, LEDs are eco-friendly, are quick to respond with a response time of several nano seconds, are driven with an impulse, and have a color reproducibility of 80% to 100%. Also, in backlights using the LEDs, a luminance and a color temperature can be arbitrarily adjusted by adjusting an amount of light.

FIG. 1 is a diagram for describing a general backlight driving apparatus.

As illustrated in FIG. 1, the general backlight driving apparatus includes a DC-DC converter 20 that supplies a driving voltage Vd to a light source 10, a feedback circuit 30 that detects a voltage level of the driving voltage Vd to feed back the detected voltage level to the DC-DC converter 20, and a duty controller 40 that controls a turn-on/off of the light source 10 according to a backlight dimming signal DIM supplied from the outside.

The light source 10 includes a plurality of LED arrays LA1 to LAn in which a plurality of LEDs are serially connected to each other. Each of the plurality of LED arrays LA1 to LAn emits light with a current which flows according to the driving voltage Vd supplied from the DC-DC converter 20.

The DC-DC converter 20 generates the driving voltage Vd on the basis of an input voltage Vcc supplied from the outside, and supplies the driving voltage Vd to the plurality of LED arrays LA1 to LAn, thereby emitting light from the LEDs of each of the plurality of LED arrays LA1 to LAn.

The feedback circuit 30 voltage-divides the driving voltage Vd outputted from the DC-DC converter 20 to generate a feedback voltage Vfb by using first and second resistors R1 and R2 which are serially connected to each other, and feeds back the generated feedback voltage Vfb to the DC-DC converter 20. Thus, the DC-DC converter 20 generates a pulse width modulation (PWM) signal corresponding to the feedback voltage Vfb supplied from the feedback circuit 30, and turns on a switching element according to the PWM signal to output the driving voltage Vd which has a voltage level equal to or higher than a certain voltage level with respect to the input voltage Vcc.

The duty controller 40 is connected to the light source 10, namely, the plurality of LED arrays LA1 to LAn, and controls a turn-on/off period of the plurality of LED arrays LA1 to LAn according to the backlight dimming signal DIM to adjust a brightness of the light source 10. Therefore, the plurality of LED arrays LA1 to LAn emit light during a duty-on section of the backlight dimming signal DIM.

However, the general backlight driving apparatus has the following problems.

First, since the switching element of the DC-DC converter 20 is turned on even during a duty-off section of the light source 10, a loss of power such as a switching loss of the switching element occurs, causing a reduction in power conversion efficiency.

Second, the plurality of LED arrays LA1 to LAn are repeatedly turned on/off by the backlight dimming signal DIM to continuously change a load condition of the DC-DC converter 20, and a load condition of the turn-on period of the LED arrays LA1 to LAn differs from that of the turn-off period of the LED arrays LA1 to LAn. For this reason, it is difficult to maintain a constant power conversion efficiency of the DC-DC converter 20.

SUMMARY

Accordingly, the present invention is directed to provide a backlight driving apparatus and an LCD device using the backlight driving apparatus that substantially obviates one or more problems due to limitations and disadvantages of the related art.

An aspect of the present invention is directed to provide a backlight driving apparatus and an LCD device, which can minimize a loss of power to enhance power conversion efficiency.

In addition to the aforesaid objects of the present invention, other features and advantages of the present invention will be described below, but will be clearly understood by those skilled in the art from descriptions below.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a backlight driving apparatus including: a light source configured to include at least one light emitting diode (LED); a DC-DC converter configured to generate a driving voltage according to a turn-on of a switching element, and supply the driving voltage to the light source; a feedback circuit configured to generate a feedback voltage corresponding to a voltage level of the driving voltage supplied from light source; a duty controller connected to the light source, and configured to control a turn-on period of the LED according to an LED duty signal corresponding to a backlight dimming signal; and a switching controller configured to generate a pulse width modulation (PWM) signal for controlling the turn-on of the switching element according to the feedback signal, generate a switching control signal corresponding to the PWM signal according to the LED duty signal, and selectively control the turn-on of the switching element.

In another aspect of the present invention, there is provided a liquid crystal display (LCD) device including: a display panel configured to include a plurality of liquid crystal cells that are respectively formed in a plurality of areas defined by intersections between a plurality of gate lines and a plurality of data lines; a panel driver configured to display an image, corresponding to external input data, in the display panel; and a backlight unit configured to irradiate light on the display panel, wherein the backlight unit includes the backlight driving apparatus.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

The terms described in the specification should be understood as follows.

As used herein, the singular forms "a", "an" and "the" are intended to include the plural forms as well, unless the context clearly indicates otherwise. The terms "first" and "second" are for differentiating one element from the other element, and these elements should not be limited by these terms.

It will be further understood that the terms "comprises", "comprising,", "has", "having", "includes" and/or "including", when used herein, specify the presence of stated features, integers, steps, operations, elements, and/or components, but do not preclude the presence or addition of one or more other features, integers, steps, operations, elements, components, and/or groups thereof.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Hereinafter, embodiments of the present invention will be described in detail with reference to the accompanying drawings.

Figure 1:
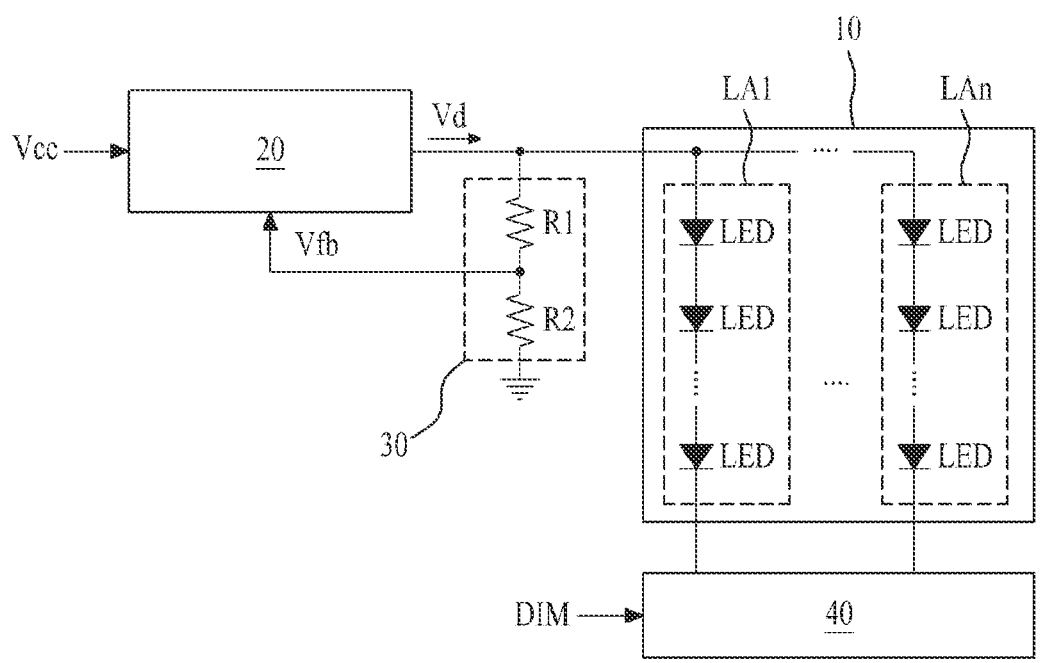
FIG. 1 is a diagram for describing a general backlight driving apparatus.
Figure 2:
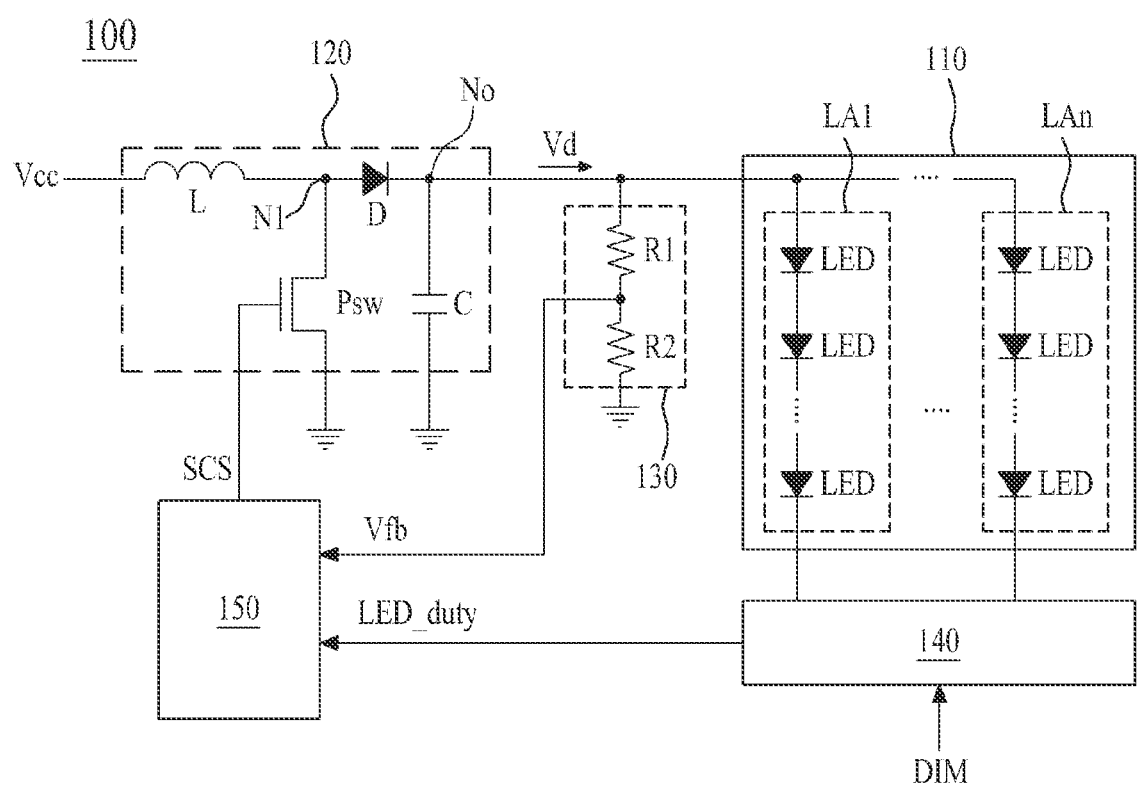
FIG. 2 is a diagram for describing a backlight driving apparatus according to an embodiment of the present invention.

FIG. 2 is a diagram for describing a backlight driving apparatus according to an embodiment of the present invention.

As illustrated in FIG. 2, a backlight driving apparatus 200 according to an embodiment of the present invention includes a DC-DC converter 120 that supplies a driving voltage Vd to a light source 110, a feedback circuit 130 that generates a feedback voltage corresponding to a voltage level of the driving voltage Vd, a duty controller 140 that controls a turn-on/ff period of the light source 110 according to an LED duty signal based on a backlight dimming signal supplied from the outside, and a switching controller 150 that controls the DC-DC converter 120 on the basis of the LED duty signal and the feedback voltage Vfb.

The light source 110 includes a plurality of LED arrays LA1 to LAn in which a plurality of LEDs are serially connected to each other. Each of the plurality of LED arrays LA1 to LAn emits light with a current which flows according to the driving voltage Vd supplied from the DC-DC converter 120.

The DC-DC converter 120 generates the driving voltage Vd according to switching control by the switching controller 150 on the basis of an input voltage Vcc supplied from the outside, and supplies the driving voltage Vd to the plurality of LED arrays LA1 to LAn, thereby emitting light from the LEDs of each of the plurality of LED arrays LA1 to LAn. For example, the DC-DC converter 120 includes a booster inductor L, a diode D, a capacitor C, and a switching element Psw. The DC-DC converter 120 outputs energy stored in the booster inductor L through the diode D according to a turn-on of the switching element Psw, and boosts the energy through the capacitor C to generate the driving voltage Vd.

The inductor L is connected between an input voltage Vcc line and a first node N1, and stores a voltage corresponding to a change amount of current due to the input voltage Vcc. The diode D is connected between the first node N1 and an output node NO, and rectifies and outputs a voltage supplied from the inductor L according to the turn-on of the switching element Psw. Here, the diode D is a backflow prevention diode, and allows the voltage supplied from the inductor L to be supplied to an output node NO. The capacitor C is charged with the voltage supplied from the inductor L through the diode D according to the turn-on of the switching element Psw, and outputs the charged voltage as the driving voltage Vd to the output node NO.

The feedback circuit 130 generates the feedback voltage Vfb corresponding to the driving voltage Vd outputted from the DC-DC converter 120 according to voltage division by first and second resistors R1 and R2 which are serially connected between the output node NO of the DC-DC converter 120 and ground, and feeds back the generated feedback voltage Vfb to the switching controller 150. Here, each of the first and second resistors R1 and R2 may be replaced with an impedance element such as an inductor or a capacitor.

The duty controller 140 is connected to the light source 110, namely, the plurality of LED arrays LA1 to LAn, and controls a turn-on/off period of the plurality of LED arrays LA1 to LAn according to the backlight dimming signal DIM to adjust a brightness of the light source 110. That is, the duty controller 140 allows a current to flow from the plurality of LED arrays LA1 to LAn to the ground during a duty-on section of a backlight dimming signal DIM, thereby emitting light from the plurality of LED arrays LA1 to LAn. On the other hand, the duty controller 140 prevents a current from flowing from the plurality of LED arrays LA1 to LAn to the ground during a duty-off section of the backlight dimming signal DIM, thereby turning off the plurality of LED arrays LA1 to LAn.

Moreover, the duty controller 140 may receive the feedback voltage Vfb from the feedback circuit 130 to additionally control the turn-on/off of the plurality of LED arrays LA1 to LAn. Also, the duty controller 140 supplies the backlight dimming signal DIM as an LED duty signal to the switching controller 150.

The switching controller 150 generates a switching control signal (SCS) on the basis of the feedback voltage Vfb supplied from the feedback circuit 130 and the LED duty signal supplied from the duty controller 140 to control the turn-on/off of the switching element Psw of the DC-DC converter 120.

Specifically, the switching controller 150 generates a PWM signal according to the feedback voltage Vfb, sets a normal mode or a burst mode according to the LED duty signal, and generates the switching control signal SCS corresponding to the PWM signal or the switching control signal SCS having a switching-off voltage level according to the set mode, thereby controlling the DC-DC converter 120. That is, when a duty-on section of the LED duty signal LED_duty is less than a predetermined reference value, the switching controller 150 sets the burst mode, and generates the switching control signal SCS corresponding to the PWM signal to repeatedly turn on the switching element Psw of the DC-DC converter 120 during only the duty-on section of the LED duty signal LED_duty, or generates the switching control signal SCS having the switching-off voltage level to fully turn off the switching element Psw of the DC-DC converter 120 during only the duty-off section of the LED duty signal LED_duty. On the other hand, when the duty-on section of the LED duty signal LED_duty is held for equal to or longer than the predetermined reference value, the switching controller 150 sets the normal mode, and generates the switching control signal SCS corresponding to the PWM signal to repeatedly turn on the switching element Psw of the DC-DC converter 120.

Therefore, the switching controller 150 turns off the switching element Psw of the DC-DC converter 120 during the duty-off section of the LED duty signal LED_duty in the burst mode, and thus prevents a reduction in power conversion efficiency such as a switching loss due to the unnecessary turn-on of the switching element Psw during the duty-off section of the light source 110.

Figure 3:
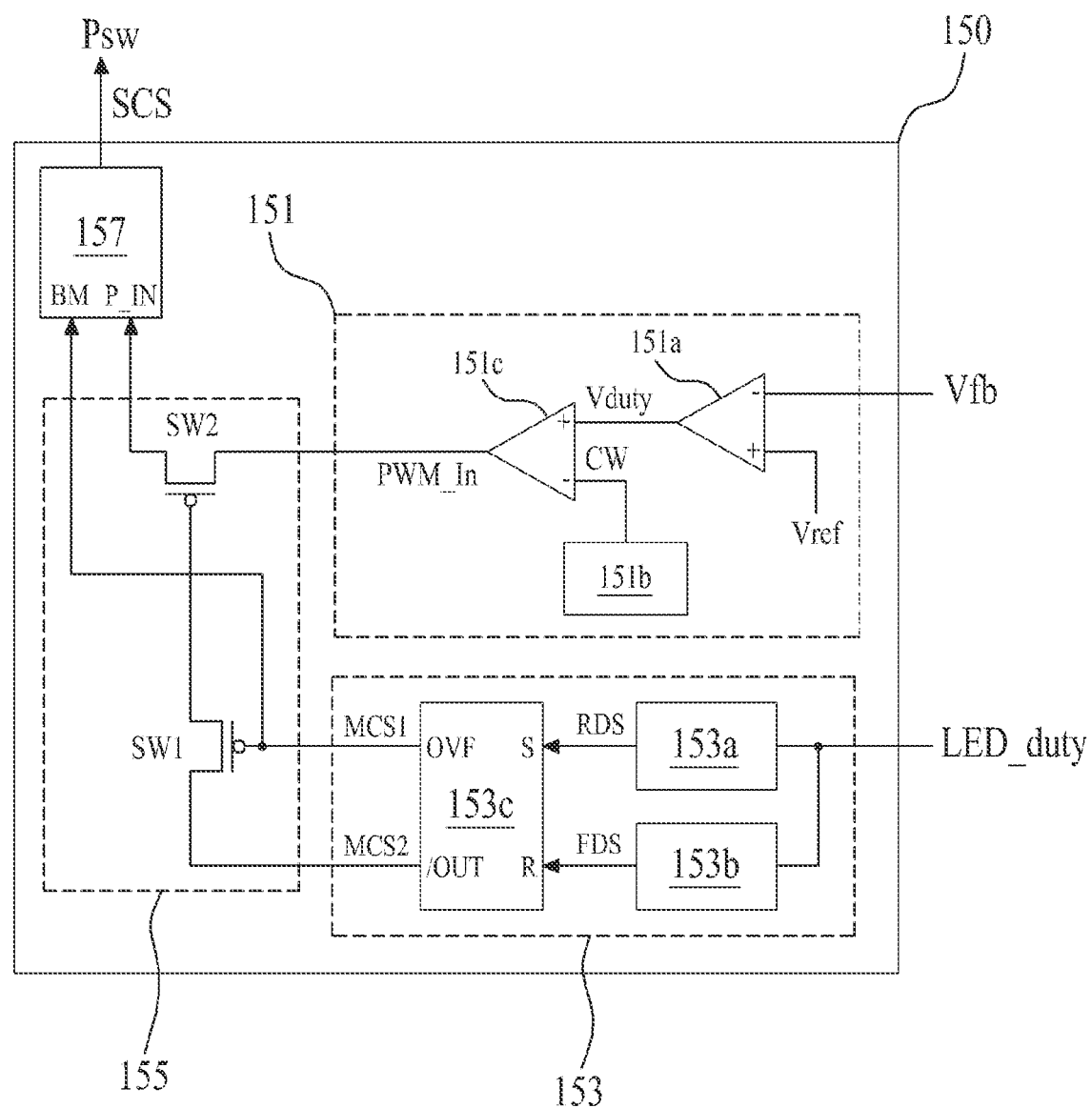
FIG. 3 is a diagram for describing a configuration of a switching controller according to an embodiment of the present invention.
Figure 4:
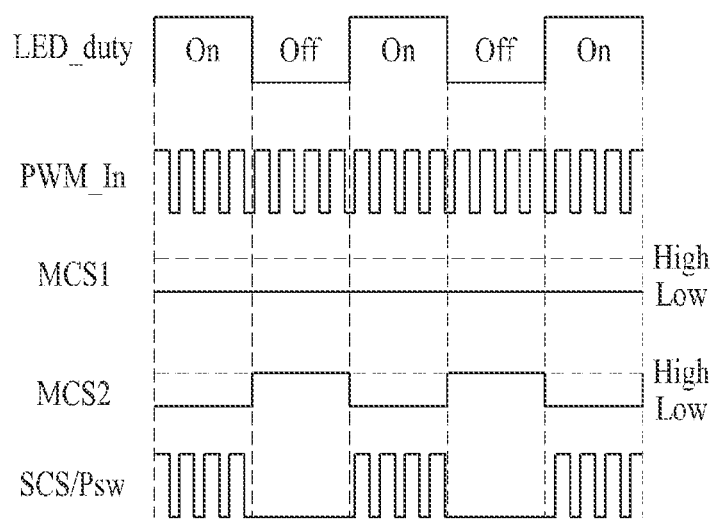
FIG. 4 is a waveform diagram showing driving waveforms of the switching controller based on a burst mode.
Figure 5:
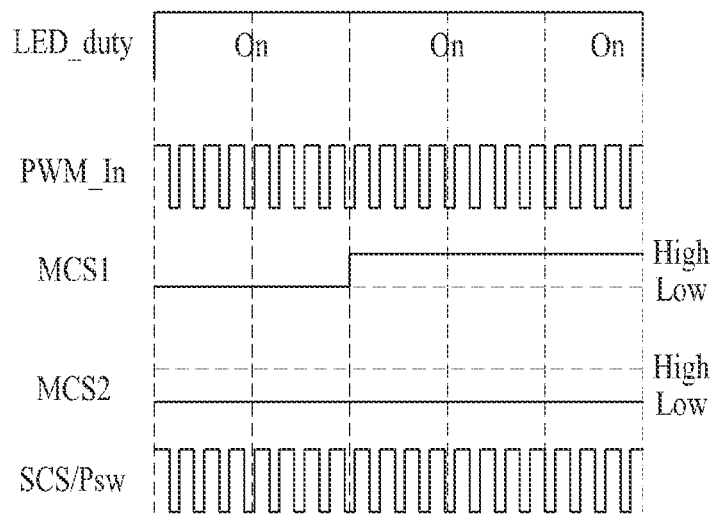
FIG. 5 is a waveform diagram showing driving waveforms of the switching controller based on a normal mode.

FIG. 3 is a diagram for describing a configuration of a switching controller according to an embodiment of the present invention, FIG. 4 is a waveform diagram showing driving waveforms of the switching controller based on a burst mode, and FIG. 5 is a waveform diagram showing driving waveforms of the switching controller based on a normal mode.

As shown in FIGS. 3 to 5, the switching controller 150 includes a PWM signal generating unit 151, a mode setting unit 153, a switching unit 155, and a switching control signal generating unit 157.

The PWM signal generating unit 151 generates the PWM signal PWM_In according to the feedback voltage Vfb supplied from the feedback circuit 130, and supplies the PWM signal PWM_In to the switching unit 155.

The PWM signal generating unit 151 according to an embodiment of the present invention includes a first comparator 151a, a chopping wave generator 151b, and a second comparator 151c.

The first comparator 151a is an operational amplifier (OP-AMP), and compares a reference voltage Vref and the feedback voltage Vfb to output a duty variable voltage Vduty.

The chopping wave generator 151b generates a chopping wave CW having a constant frequency, and supplies the chopping wave CW to the second comparator 151c.

The second comparator 151c generates the PWM signal PWM_In having a duty-on section and a duty-off section based on the duty variable voltage Vduty with respect to the chopping wave CW, and supplies the PWM signal PWM_In to the switching unit 155.

The mode setting unit 153 generates first and second mode control signals MCS1 and MCS2 for mode control on the basis of the duty-on section and duty-off section of the LED duty signal supplied from the duty controller 140. That is, when the duty-on section of the LED duty signal LED_duty is less than the predetermined reference value, the mode setting unit 153 generates the first and second mode control signals MCS1 and MCS2 for the burst mode to control the turn-on of the switching unit 155, and when the duty-on section of the LED duty signal LED_duty is equal to or greater than the predetermined reference value, the mode setting unit 153 generates the first and second mode control signals MCS1 and MCS2 for the normal mode to control the turn-on of the switching unit 155.

The mode setting unit 153 according to an embodiment of the present invention includes first and second detectors 153a and 153b and a timer 153c.

The first detector 153a detects a rising edge trigger of the LED duty signal LED_duty, and supplies a high level of rising detection signal RDS to the timer 153c.

The second detector 153b detects a falling edge trigger of the LED duty signal LED_duty, and supplies a high level of falling detection signal FDS to the timer 153c.

The timer 153c generates the first and second mode control signals MCS1 and MCS2 according to the rising detection signal RDS and the falling detection signal FDS, and supplies the first and second mode control signals MCS1 and MCS2 to the switching unit 155, thereby allowing the switching unit 155 to be turned on according to the normal mode or the burst mode.

The timer 153c includes a start terminal S receiving the rising detection signal RDS, a reset terminal R receiving the falling detection signal FDS, an overflow output terminal OVF for outputting the first mode control signal MCS1, and an inverting output terminal /OUT for outputting the second mode control signal MCS2. The timer 153c starts to operate according to the falling detection signal FDS having a high level, and stops an operation according to the falling detection signal FDS having a high level.

In detail, the timer 153c outputs the first mode control signal MCS1 having a low level through the overflow output terminal OVF and simultaneously outputs the second mode control signal MCS2 having a low level through the inverting output terminal /OUT, during the duty-on section of the LED duty signal LED_duty for which the falling detection signal FDS having a high level is supplied to the start terminal S and the falling detection signal FDS having a low level is supplied to the reset terminal R.

Moreover, the timer 153c outputs the first mode control signal MCS1 having a low level through the overflow output terminal OVF and simultaneously outputs the second mode control signal MCS2 having a high level through the inverting output terminal /OUT, during the duty-off section of the LED duty signal LED_duty for which the falling detection signal FDS having a high level is supplied to the reset terminal R.

In addition, when the falling detection signal FDS having a high level is not supplied to the reset terminal R for a predetermined reference time after the falling detection signal FDS having a high level is supplied to the start terminal S, the timer 153c outputs the first mode control signal MCS1 having a high level through the overflow output terminal OVF and simultaneously outputs the second mode control signal MCS2 having a low level through the inverting output terminal /OUT.

The switching unit 155 supplies the first mode control signal MCS1, supplied from the timer 153c of the mode setting unit 153, to the switching control signal generating unit 157, and selectively supplies the PWM signal PWM_In, supplied from the PWM signal generating unit 151, to the switching control signal generating unit 157 according to the first and second mode control signals MCS1 and MCS2.

The switching unit 155 according to an embodiment of the present invention includes first and second switch transistors SW1 and SW2.

The first switch transistor SW1 is a P-type transistor, and includes a gate receiving the first mode control signal MCS1, a first terminal receiving the second mode control signal MCS2, and a second terminal connected to a gate of the second switch transistor SW2. The first switch transistor SW1 is turned on according to the first mode control signal MCS1 to supply the second mode control signal MCS2, supplied from the timer 153c, to the second switch transistor SW2. At this time, the gate of the first switch transistor SW1 is connected to a PWM input terminal P_IN of the switching control signal generating unit 157.

The second switch transistor SW2 is a P-type transistor, and includes the gate connected to the second terminal of the first switch transistor SW1, a first terminal receiving the PWM signal PWM_In, and a second terminal connected to a burst-mode input terminal BM of the switching control signal generating unit 157. The second switch transistor SW2 is turned on according to the second mode control signal MCS2 supplied through the turned-on first switch transistor SW1 to selectively supply the PWM signal PWM_In to the switching control signal generating unit 157. Here, since the second switching transistor SW2 is the P-type transistor, the second switch transistor SW2 is turned on according to the second mode control signal MCS2 having a low level supplied through the first switch transistor SW1, or turned on when the second mode control signal MCS2 is not supplied thereto because the first switch transistor SW1 is turned off. That is, the second switch transistor SW2 is turned off only when the second mode control signal MCS2 having a high level is supplied thereto through the turned-on first switching transistor SW1.

The first and second switch transistors SW1 and SW2 are all turned on in response to the first mode control signal MCS1 having a low level and the second mode control signal MCS2 having a low level which are supplied from the timer 153c according to the duty-on section of the LED duty signal LED_duty, and thus, the switching unit 155 supplies the PWM signal PWM_In to the PWM input terminal P_IN of the switching control signal generating unit 157. Also, the first switch transistor SW1 is turned on and the second switch transistor SW2 is turned off, in response to the first mode control signal MCS1 having a low level and the second mode control signal MCS2 having a high level which are supplied from the timer 153c according to the duty-off section of the LED duty signal LED_duty, and thus, the switching unit 155 prevents the PWM signal PWM_In from being supplied to the PWM input terminal P_IN of the switching control signal generating unit 157. In addition, the first switch transistor SW1 is turned off in response to the first mode control signal MCS1 having a high level and the second mode control signal MCS2 having a low level which are supplied from the timer 153c according to the LED duty signal LED_duty having the duty-off section of 100%, and thus, the second switch transistor SW2 is turned on, whereby the switching unit 155 supplies the PWM signal PWM_In to the PWM input terminal P_IN of the switching control signal generating unit 157.

The switching control signal generating unit 157 generates the switching control signal SCS, whose a switching-on/off voltage level corresponding to the PWM signal PWM_In selectively supplied from the switching unit 155 to the PWM signal PWM_In is alternately changed, or the switching control signal SCS holding the switching-off voltage level to control the switching element Psw of the DC-DC converter 120 on the basis of the first mode control signal MCS1 supplied to the burst-mode input terminal BM through the switching unit 155.

Specifically, when the first mode control signal MCS1 having a low level is supplied to the burst-mode input terminal BM, the switching control signal generating unit 157 generates the switching control signal SCS corresponding to the PWM signal PWM_In to repeatedly turn on the switching element Psw during only a section in which the PWM signal PWM_In is supplied to the PWM input terminal P_IN, and the switching control signal generating unit 157 generates the switching control signal SCS having the switching-off voltage level to fully turn off the switching element Psw during a section in which the PWM signal PWM_In is not supplied to the PWM input terminal P_IN. That is, when the first mode control signal MCS1 having a low level is supplied to the burst-mode input terminal BM, as shown in FIG. 4, the switching control signal generating unit 157 switches the switching element Psw to the burst mode, namely, the switching control signal generating unit 157 generates and outputs the switching control signal SCS corresponding to the PWM signal PWM_In supplied from the switching unit 155 to the PWM input terminal P_IN according to the duty-on section of the LED duty signal LED_duty, and the switching control signal generating unit 157 generates and outputs the switching control signal SCS having the switching-off voltage level during a section in which the PWM signal PWM_In is not supplied from the switching unit 155 to the PWM input terminal P_IN according to the duty-off section of the LED duty signal LED_duty.

On the other hand, when the first mode control signal MCS1 having a high level is supplied to the burst-mode input terminal BM, the switching control signal generating unit 157 generates the switching control signal SCS corresponding to the PWM signal PWM_In supplied to the PWM input terminal P_IN to repeatedly turn on the switching element Psw. That is, when the first mode control signal MCS1 having a high level is supplied to the burst-mode input terminal BM, the switching control signal generating unit 157 switches the switching element Psw to the normal mode, namely, the switching control signal generating unit 157 generates and outputs the switching control signal SCS corresponding to the PWM signal PWM_In supplied from the switching unit 155 to the PWM input terminal P_IN according to the duty-on section of the LED duty signal LED_duty.

Figure 6:
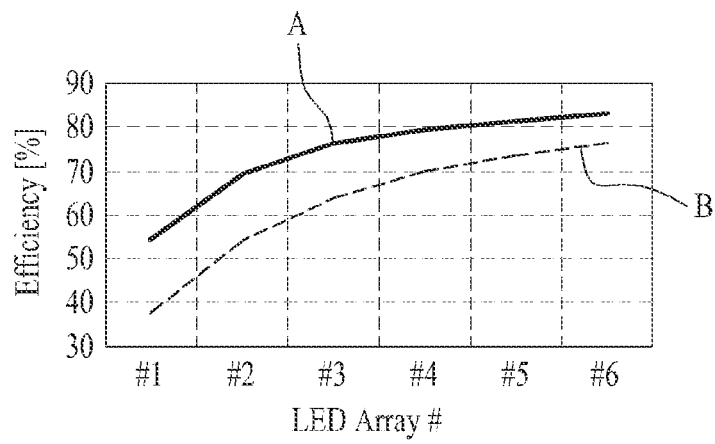
FIG. 6 is a graph that compares an efficiency of the backlight driving apparatus of the present invention with an efficiency of the related art backlight driving apparatus.

FIG. 6 is a graph that compares an efficiency of the backlight driving apparatus of the present invention with an efficiency of the related art backlight driving apparatus.

In FIG. 6, an A graph indicates an efficiency of each of first to sixth LED arrays according to the present invention, and a B graph indicates an efficiency of each of first to sixth LED arrays of the related art. As seen in FIG. 6, it can be seen that the efficiency of the first to sixth LED arrays according to the present invention is higher than the first to sixth LED arrays of the related art.

Therefore, in the backlight driving apparatus 100 according to the present invention, the switching element of the DC-DC converter is fully turned off during the duty-off section of the LED duty signal, thus preventing a power conversion efficiency from being reduced by a switching loss of the switching element which occurs during the duty-off section. Also, despite that the LED arrays LA1 to LAn are repeatedly turned on/off by the backlight dimming signal, a constant power conversion efficiency of the DC-DC converter can be maintained.

Figure 7:
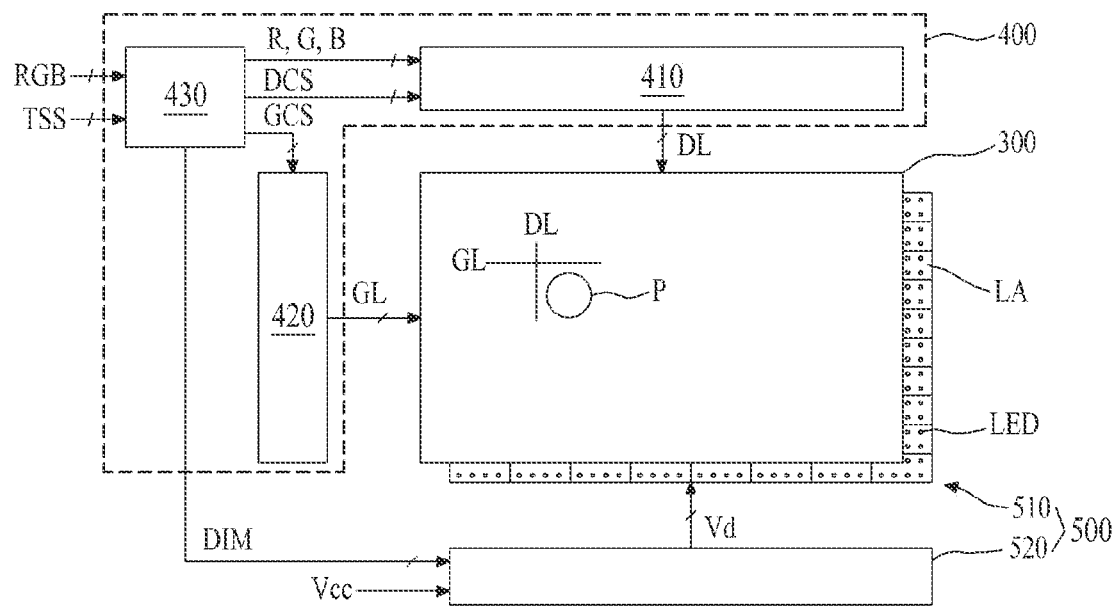
FIG. 7 is a diagram for describing an LCD device according to an embodiment of the present invention.

FIG. 7 is a diagram for describing an LCD device according to an embodiment of the present invention.

Referring to FIG. 7, the LCD device according to an embodiment of the present invention includes a display panel 300, a panel driver 400, and a backlight unit 500.

The display panel 300 includes a plurality of pixels P that are respectively formed in a plurality of areas defined by intersections between a plurality of gate lines GL and a plurality of data lines DL.

Each of the plurality of pixels P includes a thin film transistor (TFT, not shown) connected to a corresponding gate line GL and a corresponding data line DL and a liquid crystal cell connected to the TFT.

The display panel 300 generates an electric field in the liquid crystal cell according to a data voltage supplied to each pixel P to adjust a transmittance of light irradiated from the backlight unit 500, thereby displaying a certain image.

The panel driver 400 includes a data driving circuit unit 410, a gate driving circuit unit 420, and a timing controller 430.

The data driving circuit unit 410 latches data signals R, G and B inputted from the timing controller 430 according to a data control signal DCS supplied from the timing controller 430, converts the latched data signals into positive/negative analog pixel voltages by using positive/negative analog gamma voltages, generates pixel voltages having a polarity corresponding to a polarity control signal, and supplies the pixel voltages to the respective data lines DL.

The gate driving circuit unit 420 generates a gate pulse according to a gate control signal GCS supplied from the timing controller 430, and sequentially supplies the gate pulse to the gate lines GL. Here, the gate driving circuit unit 420 may be provided on a substrate when the TFTs are being formed.

The timing controller 430 aligns input data RGB inputted from the outside so as to properly match a pixel structure of the display panel 200, and supplies the aligned data RGB to the data driving circuit unit 410.

Moreover, the timing controller 400 generates a data control signal DCS for controlling an operation timing of the data driving circuit unit 410 and a gate control signal GCS for controlling an operation timing of the gate driving circuit unit 420 by using a timing synch signal TSS inputted thereto. Here, the timing sync signal TSS may include a vertical sync signal (Vsync), a horizontal sync signal (Hsync), a data enable signal (DE), and a dot clock (DCLK). The data control signal DCS may include a source start pulse (SSP), a source sampling clock (SSC), a source output enable signal (SOE), and the polarity control signal (POL). The gate control signal GCS may include a gate start pulse (GSP), a gate shift clock (GCLK), a gate shift clock (GSC), and a gate output enable signal (GOE).

In addition, the timing controller 430 generates the backlight dimming signal DIM for controlling a luminance of the backlight unit 500 according to a brightness of an image corresponding to one frame, and supplies the backlight dimming signal DIM to the backlight unit 500. Here, the timing controller 430 analyzes input data RGB of the one frame to calculate an average image level, and generates the backlight dimming signal DIM based on the calculated average image level. For example, when the image corresponding to the one frame is determined as a relatively bright image according to the average image level, the timing controller 430 may generate the backlight dimming signal DIM for reducing a luminance of the backlight unit 500, but when the image corresponding to the one frame is determined as a relatively dark image according to the average image level, the timing controller 430 may generate the backlight dimming signal DIM for increasing a luminance of the backlight unit 500.

The backlight unit 500 emits light from a plurality of LEDs to irradiate the light on the display panel 300. The backlight unit 500 includes a light source 510, including a plurality of LED arrays LA configured with the plurality of LEDs which are serially connected to each other, and a backlight driver 520. Here, the backlight unit 500 is configured identically to the backlight driving apparatus 100 according to an embodiment of the present invention described above with reference to FIGS. 2 to 5, and thus, a repetitive description is not provided.

The backlight unit 500 may further include an optical sheet member (not shown) that enhances a luminance characteristic of light incident from the light source 500 to irradiate the luminance-enhanced light on the display panel 300.

As described above, the switching element of the DC-DC converter is fully turned off during the duty-off section of the LED duty signal, thus preventing power conversion efficiency from being reduced by a switching loss of the switching element which occurs during the duty-off section.

Moreover, despite that the LED arrays are repeatedly turned on/off by the backlight dimming signal, a constant power conversion efficiency of the DC-DC converter can be maintained.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:
1. A backlight driving apparatus comprising:
a light source comprising at least one light emitting diode (LED);
a duty controller coupled to the light source, the duty controller configured to receive a backlight dimming signal and generate a LED duty signal that turns the light source on and off by alternating between a first state and a second state, wherein the light source is turned on responsive to the LED duty signal being in the first state, and the light source is turned off responsive to the LED duty signal being in the second state, a duty cycle of the LED duty signal indicative of the brightness of the light source;

a DC-DC converter comprising a switching element, the DC-DC converter configured to receive an input voltage and generate a driving voltage responsive to repeated on/off switching of the switching element, wherein the driving voltage is supplied to the light source and the on or off states of the switching element are controlled by a switching control signal received by the switching element;

a feedback circuit configured to receive the driving voltage and generate a feedback voltage according to a voltage level of the driving voltage;

a switching controller configured to receive the LED duty signal and the feedback voltage to generate the switching control signal, wherein:

responsive to the LED duty signal being in the first state, the switching controller outputs a pulse width modulation (PWM) signal generated according to the feedback voltage as the switching control signal, the PWM signal alternating between an on state configured to turn on the switching element and an off state configured to turn off the switching element to generate the repeated on/off switching of the switching element, a duty cycle of the PWM signal indicative of the voltage level of the driving voltage, and responsive to the LED duty signal being in the second state, the switching controller outputs an off signal as the switching control signal, the off signal configured to turn off the switching element.

2. The backlight driving apparatus of claim 1, wherein the switching controller comprises:

a PWM signal generating unit configured to receive the feedback voltage and generate the PWM signal according to the feedback voltage;

a mode setting unit configured to receive the LED duty signal and generate a mode control signal indicative of the LED duty signal being in the first state or the second state;

a switching unit configured to receive the mode control signal and the PWM signal, wherein the switching unit selectively outputs the PWM signal responsive to receiving the mode control signal indicative of the LED duty signal being in the first state, and the switching unit prevents output of the PWM signal responsive to receiving the mode control signal indicative of the LED duty signal being in the second state; and a switching control signal generating unit configured to generate the switching control signal, wherein the switching control signal generating unit outputs the PWM signal as the switching control signal responsive to receiving the PWM signal from the switching unit, and the switching control signal generating unit outputs the off signal as the switching control signal if the PWM signal is not received.

3. The backlight driving apparatus of claim 2, wherein the mode setting unit comprises:

a first detector configured to detect a rising edge trigger of the LED duty signal to output a rising detection signal;

a second detector configured to detect a falling edge trigger of the LED duty signal to output a falling detection signal; and a timer configured to generate the mode control signal comprising a first mode control signal and a second mode control signal according to the rising detection signal and the falling detection signal, and supply the first and second mode control signals to the switching unit.

4. The backlight driving apparatus of claim 3, wherein:

when a time of the LED duty signal in the first state is less than a predetermined reference value, the timer generates the first and the second mode control signals both having a first logic level as indicative of the LED duty signal being in the first state, and the timer generates the first mode control signal having the first logic level and the second mode control signal having a second logic level as indicative of the LED duty signal being in the second state; and when the time of the LED duty signal in the first state is equal to or greater than the predetermined reference value, the timer generates the first mode control signal having the second logic level and the second mode control signal having the first logic level as indicative of the LED duty signal being in the first state.

5. The backlight driving apparatus of claim 4, wherein the switching unit comprises:

a first switch transistor coupled to the first mode control signal and the second mode control signal, the first switch transistor configured to output the second mode control signal according to the first mode control signal; and a second switch transistor coupled to the output of the first switch transistor and the PWM signal, the second switch transistor configured to supply the PWM signal according to the output of the first switch transistor.

6. The backlight driving apparatus of claim 5, wherein the second switch transistor is turned off only when the first mode control signal has the first logic level and the second mode control signal having the second logic level is supplied through the first switch transistor.

7. A liquid crystal display (LCD) device comprising:

a display panel configured to comprise a plurality of liquid crystal cells that are respectively formed in a plurality of areas defined by intersections between a plurality of gate lines and a plurality of data lines;

a panel driver configured to display an image, corresponding to external input data, in the display panel; and a backlight unit configured to irradiate light on the display panel, wherein the backlight unit comprises a backlight driving apparatus of claim 1.

8. The LCD device of claim 7, wherein the switching controller comprises:

a PWM signal generating unit configured to receive the feedback voltage and generate the PWM signal according to the feedback voltage;

a mode setting unit configured to receive the LED duty signal and generate a mode control signal indicative of the LED duty signal being in the first state or the second state;

a switching unit configured to receive the mode control signal and the PWM signal, wherein the switching unit selectively outputs the PWM signal responsive to receiving the mode control signal indicative of the LED duty signal being in the first state, and the switching unit prevents output of the PWM signal responsive to receiving the mode control signal indicative of the LED duty signal being in the second state; and a switching control signal generating unit configured to generate the switching control signal, wherein the switching control signal generating unit outputs the PWM signal as the switching control signal responsive to receiving the PWM signal from the switching unit, and the switching control signal generating unit outputs the off signal as the switching control signal if the PWM signal is not received.

9. The LCD device of claim 8, wherein the mode setting unit comprises:
a first detector configured to detect a rising edge trigger of the LED duty signal to output a rising detection signal;
a second detector configured to detect a falling edge trigger of the LED duty signal to output a falling detection signal; and
a timer configured to generate the mode control signal comprising a first mode control signal and a second mode control signal according to the rising detection signal and the falling detection signal, and supply the first and second mode control signals to the switching unit.

10. The LCD device of claim 9, wherein:
when a time of the LED duty signal in the first state is less than a predetermined reference value, the timer generates the first and the second mode control signals both having a first logic level as indicative of the LED duty signal being in the first state, and the timer generates the first mode control signal having the first logic level and the second mode control signal having a second logic level as indicative of the LED duty signal being in the second state; and
when the time of the LED duty signal in the first state is equal to or greater than the predetermined reference value, the timer generates the first mode control signal having the second logic level and the second mode control signal having the first logic level as indicative of the LED duty signal being in the first state.

11. The LCD device of claim 10, wherein the switching unit comprises:
a first switch transistor coupled to the first mode control signal and the second mode control signal, the first switch transistor configured to output the second mode control signal according to the first mode control signal; and
a second switch transistor coupled to the output of the first switch transistor and the PWM signal, the second switch transistor configured to supply the PWM signal according to the output of the first switch transistor.

12. The LCD device of claim 11, wherein the second switch transistor is turned off only when the first mode control signal has the first logic level and the second mode control signal having the second logic level is supplied through the first switch transistor.

13. The LCD device of claim 7, wherein the panel driver comprises a timing controller configured to analyze input data of one frame to generate a backlight dimming signal for controlling a luminance of the backlight unit, and supply the backlight dimming signal to the backlight unit.

* * * * *